June 5, 1951 C. R. WILSON 2,555,949
WARNING DEVICE FOR MOTION-PICTURE PROJECTORS
Filed Feb. 27, 1950 2 Sheets-Sheet 1

Inventor
Clifford R. Wilson
By Clarence A. O'Brien
and Harvey B. Jacobson
Attorneys Inventor
Clifford R. Wilson Patented June 5, 1951

2,555,949

UNITED STATES PATENT OFFICE 2,555,949

WARNING DEVICE FOR MOTION-PICTURE PROJECTORS

Clifford R. Wilson, New Lexington, Ohio, assignor of twelve and one-half per cent to Kenneth E. Nutter and twelve and one-half per cent to Mabel E. Nutter, New Lexington, Ohio Application February 27, 1950, Serial No. 146,478

3 Claims. (Cl. 177—311)

1

This invention relates to new and useful improvements and structural refinements in motion picture projectors, and the principal object of the invention is to attract the attention of the operator in instances where the film breaks, or where the speed of the film is retarded, or where the film remains stationary while the douser in the lamp house is open.

This object is achieved by the provision of an electrical warning unit together with a plurality of switches, one of the latter being actuated by the opening and closing of the douser while the remaining switches are responsive to the tension and movement of the film, all the switches being in series with the warning unit so that the latter is automatically energized when any of the above mentioned irregularities in operation take place.

Some of the advantages of the invention reside in the simplicity of construction, in its efficient and dependable operation, and in its adaptability for use on motion picture projectors of different sizes and types.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
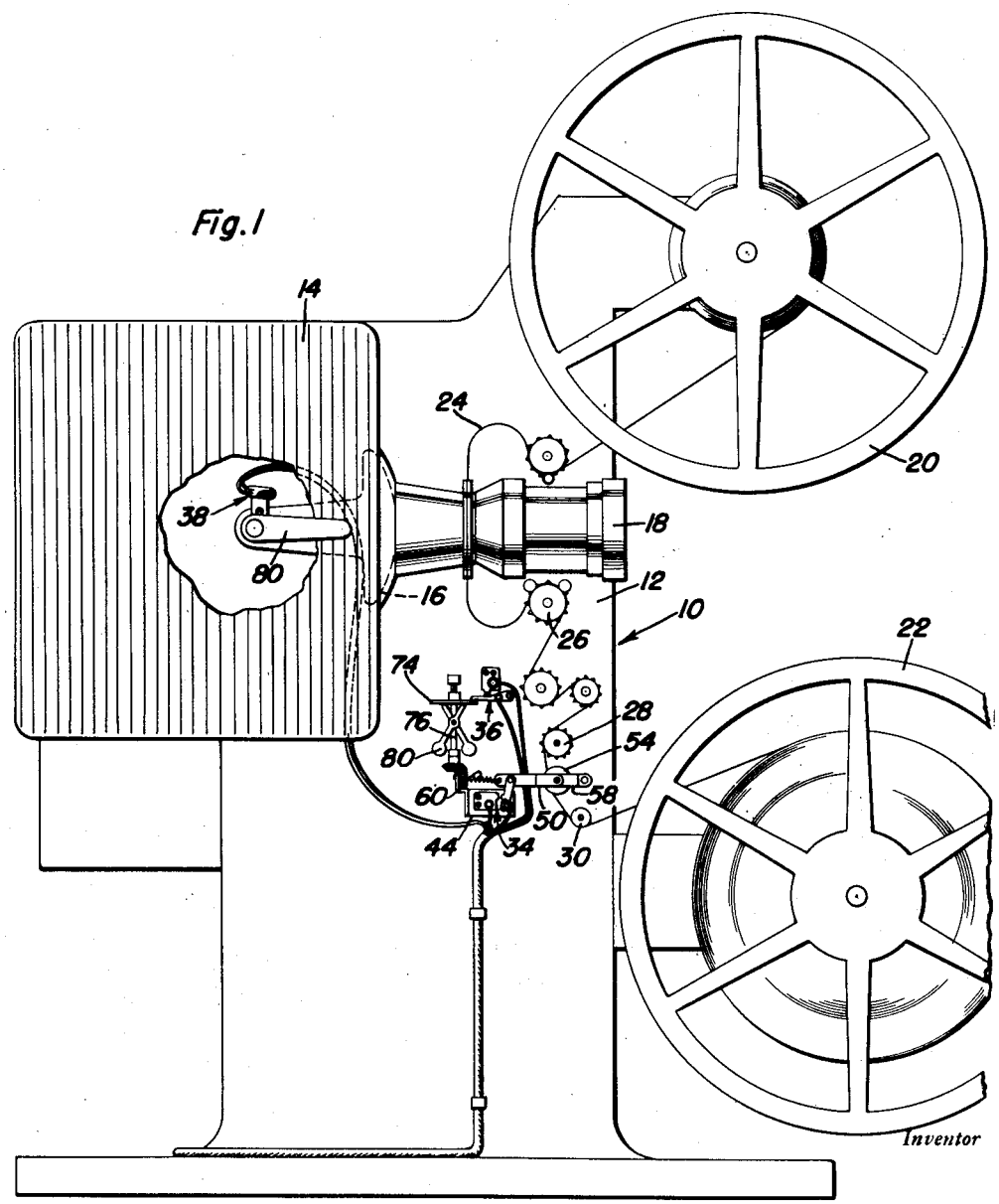
Figure 1 is a side elevational view of a motion picture projector showing the invention in situ thereon.
Figure 2:
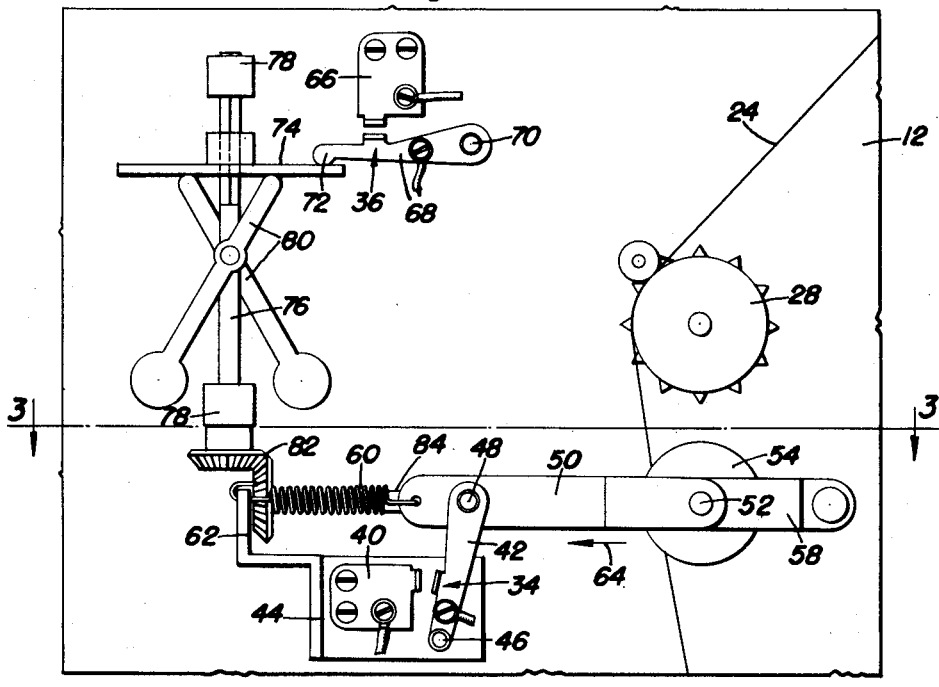
Figure 2 is a fragmentary side elevational detail of two of the switches and their actuating means.

Referring now to the accompanying drawings in detail, the general reference character 10 designates a conventional motion picture projector including a frame or chassis 12, a lamp house 14 equipped with the usual douser 16, a lens unit 18 and a pair of reels 20, 22 carrying the film 24 which is driven past the lens unit 18 by intermittent feed mechanism 26. In addition, the film 24 passes over a sprocket 28 and a fire roller 30, the stretch of the film between the sprocket and the fire roller 28, 30 respectively usually being susceptible to a certain amount of slackness.

The instant invention consists of a warning

2 device including a suitable electric alarm 32 (which may be either visual or audible) the alarm unit 32 being suitably mounted on the chassis 12 of the projector or in the vicinity of the projector, as desired.

The means for actuating the alarm unit 32 consists of three separate and distinct switches 34, 36 and 38, the switch 34 embodying in its construction a stationary contact member 40 and a pivoted contact arm 42. The contact member 40 is rigidly secured to a bracket 44 carried by the projector chassis 12, and the arm 42 is pivoted to the same bracket as at 46. The arm 42, in turn, is pivoted as at 48 to a slidable actuating member or yoke 50 carrying a rotatable shaft 52 on which is mounted a sprocket roller 54.

This roller is adapted to engage the comparatively slack stretch of the film 24 between the sprocket 28 and the roller 30 and, of course, as the film travels along its path, rotation will be imparted to the sprocket roller 54, as will be clearly apparent.

Figure 3:
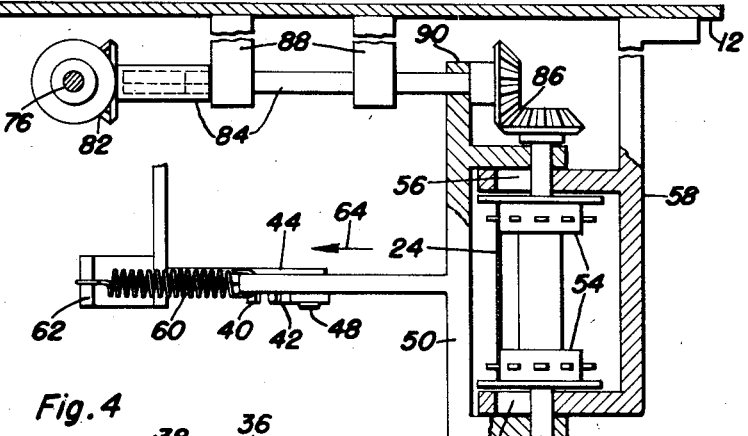
Figure 3 is a sectional view, taken substantially in the plane of the line 3—3 in Figure 2.

For guiding purposes the shaft 52 is slidable in a pair of slots 56 provided in a bracket 58 secured to the frame or chassis 12, (see Figure 3) and it is to be noted that a tension spring 60 extends between the member 50 and an upwardly projecting limb 62 provided on the bracket 44, whereby the member 50 is urged in the direction of the arrow 64 and tension is applied to the film 24 by the sprocket roller 54. As long as the film 24 is intact, that is, unbroken, the resiliency of the spring 60 is sufficient only to maintain the film under tension while the contact members 40, 42 of the switch 34 are separated and the circuit through the switch is open. However, in the event that the film 24 breaks, the spring 60 will draw the member 50 as far as possible in the direction of the arrow 64, in which event the contact members 40, 42 of the switch 34 will be brought together and the electric circuit through the switch 34 will be completed.

The aforementioned switch 36 consists of a stationary contact member 66 which is secured to the chassis 12 and a coacting contact arm 68 which is pivoted to the chassis as at 70. The contact arm 68 is provided with a projecting finger 72 which engages an actuating plate 74, the latter being slidable on but rotatable with a vertical shaft 76 which is rotatably mounted on the chassis 12 in a pair of bearings 78. The shaft 76 also carries a centrifugal governor 80 and is driven through the medium of bevel gearing 82 by a telescopic countershaft 84 which, in turn, is driven from the shaft 52 through the medium of the bevel gearing 86. The countershaft 84 is rotatably journalled in suitable bearings 88 provided on the chassis 12 and in an extension 90 provided on the member 59, it being noted that the telescopic arrangement of the countershaft 84 facilitates unrestricted sliding movement of the member 90 to effect actuation of the switch 34.

The governor 80, of course, slides the plate 74 upwardly on the shaft 76 when the speed of the shaft decreases, and matters are so arranged that when the speed of the shaft 76 is retarded (or when the shaft 76 is stationary) the contact members 66, 68 of the switch 36 are together and the circuit through the switch 36 is closed. Conversely, when the shaft 76 is rotated at a speed which is properly proportioned to the rate of travel of the film 24, the switch 36 is open and so remains until the film is retarded or stopped.

Finally, the switch 38 is preferably a mercury switch of a conventional type which is secured to the actuating handle 80 of the douser 16 in any suitable manner, and this switch 38 is so arranged so that when the douser 16 is closed the switch is open and vice versa.

Figure 4:
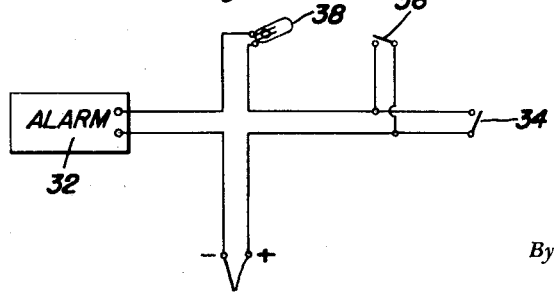
Figure 4 is a wiring diagram of the electrical components used in the invention.

Referring now to the accompanying Figure 4, it will be noted that the two switches 34, 36 are connected together in parallel while the switch 38 is connected in series with the two switches 34, 36 to the alarm unit 32 and to the source of electric current indicated at 92. As a result, when the projector is in operation and functions normally, the switch 38 is closed while the switches 34, 36 are open. However, if the film 24 should break, the switches 34, 36 will be closed and will complete the electrical circuit for energizing the alarm unit 32. It is to be noted that this action may take place independently in response to the closing of either of the two switches 34, 36.

Secondly, if the speed of the film should be retarded, the governor 80 will close the switch 36, thus completing the circuit through the closed switch 38 to energize the warning unit 32 independently of the closing of the switch 34.

In effect, the switch 36 alone is capable of actuating the alarm unit when the film breaks or looses tension by a failure in the usual drive to the take-up reel 22, the switch 34 being intended for auxiliary protection in the event of failure of the switch 36.

Finally, if the douser 16 should remain open while the film is stationary, the switch 38 will be closed as will the switch 36, thus again energizing the alarm unit 32.

It is to be noted that although the various switches are primarily intended to energize the audible or visible alarm unit 32, the latter may be supplemented or substituted by a relay which would automatically open the electrical circuit to the projector lamp and film driving mechanism in the event of any of the above outlined abnormalities in operation.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a motion picture projector having a film adapted to travel through a relatively slack stretch and including a douser swingable from an open to a closed position, a warning device comprising a movable actuating member mounted on said projector, a rotatable roller carried by said member and engaging the slack stretch of the film, resilient means connected to said member for tensioning said film, a first electric switch operatively connected to said member for closing when the film is slack, a centrifugal governor driven by said roller, a second electric switch connected in parallel to the first switch and adapted to be closed by said governor when the latter is retarded, a third electric switch operatively connected to said douser for closing when the douser is open, and electric warning means connected in series through the third switch to the first and second switches whereby said warning means may be energized by breakage or retardation of film when said douser is in its open position.

2. In a motion picture projector having a film adapted to travel through a relatively slack stretch, a warning device comprising a movable actuating member mounted on said projector, a rotatable roller carried by said member and engaging the slack stretch of the film, resilient means connected to said member for tensioning said film, a first electric switch operatively connected to said member for closing when the film is slack, a centrifugal governor driven by said roller, a second electric switch adapted to be closed by said governor when the latter is retarded, said switches being connected in parallel, and electric warning means connected in series to said switches, whereby the warning means may be energized by breakage or retardation of the film.

3. In a motion picture projector having a film adapted to travel through a relatively slack stretch, means for actuating a warning device, said means comprising an actuating member slidably mounted on said projector for movement toward and away from said film, a rotatable shaft carried by said member, a sprocket secured to said shaft and engaging the slack stretch of the film, resilient means for sliding said member away from the film for tensioning the latter, an electric switch operatively connected to said member and adapted to be closed thereby when the film is slack, a telescopic countershaft operatively connected to the first mentioned shaft, a centrifugal governor driven by said countershaft, and a second electric switch adapted to be closed by said governor when the latter is retarded.

CLIFFORD R. WILSON.

REFERENCES CITED

The following references are of record in the file of this patent:

UNITED STATES PATENTS

| Number | Name | Date |
|---|---|---|
| 1,502,434 | Lick | July 22, 1924 |
| 2,016,506 | Maluss et al. | Oct. 8, 1935 |

FOREIGN PATENTS

| Number | Country | Date |
|---|---|---|
| 707,730 | France | Apr. 20, 1931 |
| 788,906 | France | Aug. 5, 1935 |